(12) United States Patent
Zanchi

(10) Patent No.: US 10,710,137 B2
(45) Date of Patent: Jul. 14, 2020

(54) METHOD OF MAKING A HOSE CONNECTION FOR A HOSE

(71) Applicant: BREMBOFLEX S.P.A., Brembate di Sopra (Bergamo) (IT)

(72) Inventor: Ambrogio Zanchi, Brembate di Sopra (IT)

(73) Assignee: BREMBOFLEX S.P.A., Brembate di Sopra (IT)

( * ) Notice: Subject to any disclaimer, the term of this patent is extended or adjusted under 35 U.S.C. 154(b) by 790 days.

(21) Appl. No.: 15/313,130

(22) PCT Filed: May 13, 2015

(86) PCT No.: PCT/EP2015/060570
§ 371 (c)(1),
(2) Date: Nov. 22, 2016

(87) PCT Pub. No.: WO2015/177015
PCT Pub. Date: Nov. 26, 2015

(65) Prior Publication Data
US 2017/0136515 A1  May 18, 2017

(30) Foreign Application Priority Data

May 22, 2014  (IT) .............................. MI2014A0945

(51) Int. Cl.
*B21D 22/26* (2006.01)
*B21D 41/02* (2006.01)
(Continued)

(52) U.S. Cl.
CPC ............. *B21D 22/26* (2013.01); *B21D 41/02* (2013.01); *F16L 33/20* (2013.01); *F16L 33/30* (2013.01); *F16L 33/207* (2013.01)

(58) Field of Classification Search
CPC ......... F16L 33/20; F16L 33/30; F16L 33/207; F16L 33/223; F16L 33/225; F16L 33/226
(Continued)

(56) References Cited

U.S. PATENT DOCUMENTS 454,647 A  6/1891  Hallas
2,260,454 A * 10/1941  Hedeman ................ F16L 33/22
285/242
(Continued)

FOREIGN PATENT DOCUMENTS

EP  0441174 A2  8/1991

OTHER PUBLICATIONS

Machine translation of EP 0441174, Translated Dec. 20, 2019, 3 Pages. (Year: 1991).*
(Continued)

*Primary Examiner* — Gregory D Swiatocha
(74) *Attorney, Agent, or Firm* — Troutman Sanders LLP

(57) ABSTRACT

A method of making a hose connection for a hose, including at least the following steps of processing of a metal sheet: drawing for the creation of a semi-processed axially hollow cylindrical piece having a base end and a top end; opening of the base end of the semi-processed piece; forming of an external flange of the semi-processed piece; and forming by a mould of a terminal section of the semi-processed piece comprising the base end for the creation of at least one tooth of hooking to the hose, the mould subjecting the terminal section of the semi-processed piece to an axial compression of a magnitude such as to generate on the terminal section of the semi-finished piece a plastic deformation of radial expansion through which the terminal section shapes to the surfaces of the mould.

11 Claims, 4 Drawing Sheets

(51) Int. Cl.
  *F16L 33/30* (2006.01)
  *F16L 33/20* (2006.01)
  *F16L 33/207* (2006.01)

(58) Field of Classification Search
  USPC ....... 29/507, 890.144, 508, 890.15; 285/256, 285/258, 239, 240, 241, 242, 251
  See application file for complete search history.

(56) References Cited

U.S. PATENT DOCUMENTS

| | | | | |
|---|---|---|---|---|
| 2,314,002 A * | 3/1943 | Lusher | ................. | B21D 39/046 285/256 |
| 3,833,984 A * | 9/1974 | Dietzel | ................. | B21D 39/04 29/523 |
| 4,395,811 A * | 8/1983 | Frye | ........................ | F16L 33/00 29/507 |
| 4,978,149 A * | 12/1990 | Sauer | ................. | F16L 33/2071 285/256 |
| 5,211,046 A | 5/1993 | Inagaki | | |
| 5,261,709 A * | 11/1993 | McNaughton | .......... | F16L 33/30 285/239 |
| 5,295,718 A * | 3/1994 | Bartholomew | ....... | F16L 33/213 285/256 |
| 5,310,224 A | 5/1994 | Tenglund | | |
| 5,388,870 A * | 2/1995 | Bartholomew | ..... | F16L 27/0816 285/242 |
| 5,868,435 A * | 2/1999 | Bartholomew | ..... | F16L 27/0816 285/23 |
| 6,206,432 B1 * | 3/2001 | Kamiyama | ............. | F16L 37/23 285/315 |
| 7,014,216 B2 * | 3/2006 | Mittersteiner | ........ | F16L 33/225 285/247 |
| 2004/0128819 A1 | 7/2004 | Patterson et al. | | |
| 2008/0036202 A1 * | 2/2008 | Baxi | ................... | F16L 33/2073 285/256 |
| 2015/0226356 A1 * | 8/2015 | Kury | .................. | F16L 33/2076 285/256 |

OTHER PUBLICATIONS

International Search Report and Written Opinion of ISA dated Sep. 4, 2015 issued in corresponding PCT International Application No. PCT/EP2015/060570.

* cited by examiner

METHOD OF MAKING A HOSE CONNECTION FOR A HOSE

CROSS-REFERENCE TO RELATED APPLICATIONS

This is a U.S. national phase application under 35 U.S.C. § 371 of International Patent Application No. PCT/EP2015/060570, filed on May 13, 2015, and claims benefit of priority to Italian Patent Application No. MI2014A000945, filed May 22, 2014. The entire contents of these applications are hereby incorporated by reference.

TECHNICAL FIELD

The present invention relates to a method of making a hose connection for a hose.

BACKGROUND

Hose connections for hoses obtained with various technologies have been present on the market for some time.

A widely used technology provides for moulding of a hollow cylindrical body from a metal sheet and forming on the hollow cylindrical body of teeth hooking to the hose by means of a rolling device which provides for a tool which may be inserted in the axial cavity of the hollow cylindrical body and provided with radially extendible elements adapted to deform the hollow cylindrical body from the inside towards the outside.

With this system, it is possible to obtain inexpensive hoses with a considerable saving of connection material and it is also possible to use a lead-free material, as required by recent environmental safety regulations.

However, this type of processing has a notable technical limitation linked with the maximum thickness of the metal sheet processable, beyond which the rolling technology for manufacture of the teeth hooking to the hose becomes inefficient. With the same type of material, this obviously also places a limit on the mechanical properties of the final product.

In particular, there are hose connections on the market manufactured through moulding and rolling of a metal sheet with a maximum thickness of around 0.4 mm.

SUMMARY

The task of the present invention is, therefore, eliminating the cited drawbacks of the prior art.

Within the scope of this technical task, an object of the invention is to provide a method for making an economical hose connection which has appropriate mechanical properties, Another object of the invention is providing a simple and highly productive method for making a hose connection.

The task, and also these and other objects, according to the present invention, are achieved by a method of making a hose connection for a hose comprising at least the following steps of processing of a metal sheet:

drawing for the creation of a semi-processed axially hollow cylindrical piece having a base end and a top end;
   opening of the entire base end of the semi-processed piece;
   forming of an external flange of the semi-processed piece: and
   forming of at least one external tooth of hooking to the hose;

characterised in that said forming step of at least one hooking tooth is performed, after the opening of said entire base end, with a mould which is closed onto a terminal section of the semi-processed piece comprising the base end so as to subject it to an axial compression inducing a plastic deformation of radial expansion towards the outside through which said terminal section shapes to the surfaces of the mould.

In a preferred embodiment of the invention, the mould has a tapered surface and an annular flat surface oriented coaxially to said tapered surface.

In a preferred embodiment of the invention, the surfaces of the mould may be activated in a relative travelling movement along an axis of the mould.

In a preferred embodiment of the invention, before closure of the mould a centring punch is inserted through the open axial cavity of said semi-processed piece.

In a preferred embodiment of the invention, the metal sheet is steel.

In a preferred embodiment of the invention, the metal sheet is brass.

In a preferred embodiment of the invention, the metal sheet has a thickness not less than 0.6 mm.

In a preferred embodiment of the invention, a further step of processing is provided consisting of selectively reducing the diameter of a first cylindrical portion of the semi-processed piece comprising the base end of the semi-processed piece with respect to a second cylindrical portion of the semi-processed piece adjacent to said first cylindrical portion.

Other characteristics of the present invention are also defined in the claims which follow.

It must be noted that moulding of the terminal section of the semi-processed piece may be performed with a metal sheet of a thickness suited to the mechanical properties required by the specific application of the hose connection.

In particular, said method allows use of metal sheets with a thickness well above 0.4 mm, for example metal sheets having a thickness of 0.6 mm, from which final products are obtained which, naturally, using the same type of material, offer better performances in terms of mechanical properties with respect to products obtained from thinner metal sheets.

BRIEF DESCRIPTION OF THE DRAWINGS

Further characteristics and advantages will become more apparent from the following detailed description of a method of making a hose connection according to the invention, illustrated with the aid of the accompanying figures, in which.

DETAILED DESCRIPTION

Figure 1:
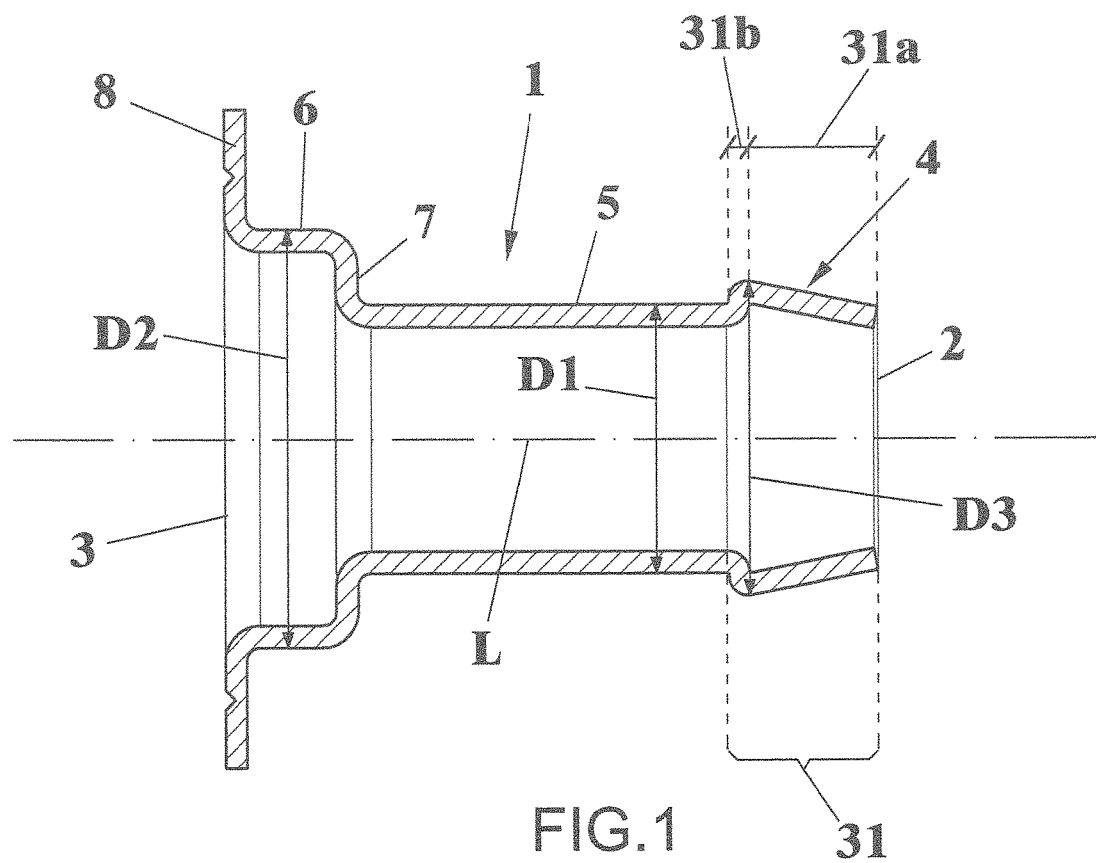
FIG. 1 shows an axial section view of a first type of hose connection obtainable with the method provided by the invention.

Equivalent parts of the different preferred embodiments of the invention will be indicated with the same reference number.

The hose connection for hoses is formed of a hollow body 1 in metal sheet which extends along an axis L and has an open base end 2 and a top end 3, also open, opposite the base end 2.

A first cylindrical portion 5 of the hollow body 1 has a shape change of its terminal section 31 comprising the base end 2 of the hollow body 1 such as to define a tooth 4 of hooking to the hose (not shown).

The changed terminal section 31 has a wedge-shaped profile which projects radially outside the outer axial generatrices of the first cylindrical portion 5.

The changed, terminal section 31 has, in particular, in the axial direction, in the sense that it goes from the base end 2 towards the interior of the hollow body 1, a first tapered wall 31a coaxial and divergent from the axis L and a second wall 31b which connects the first wall 31a to the remaining unchanged section of the first cylindrical portion 5.

The metal sheet body 1 has a second cylindrical portion 6 having an outer diameter D2 greater than the outer diameter D1 of the first cylindrical portion 5.

The first portion 5 and the second portion 6 of the metal sheet body 1 are connected by a connection wall 7 of the metal sheet body 1 which extends substantially on an orthogonal plane to the axis L.

The connection wall 7 of the metal sheet body 1 has the function of striking abutment for a nut (not shown) which can be screwed onto the hollow body 1 from the base end 2.

The outer diameter D2 of the second cylindrical portion 6 of the body 1 is greater than the maximum outer diameter D3 assumed by the tooth 4 at the transition zone between the first wall 31a and the second wall 31b.

The metal sheet body 1 is also shaped so as to define an external flange 8 of resting for a seal (not shown).

The flange 8 extends in a radial direction from the second cylindrical portion 6 of the metal sheet body 1.

In the version of the body 1 shown in FIG. 1, the flange 8 is positioned at the top end 3 of the body 1. With this version of the metal sheet body 1, the seal must be applied in the connection installation step.

Figure 2:
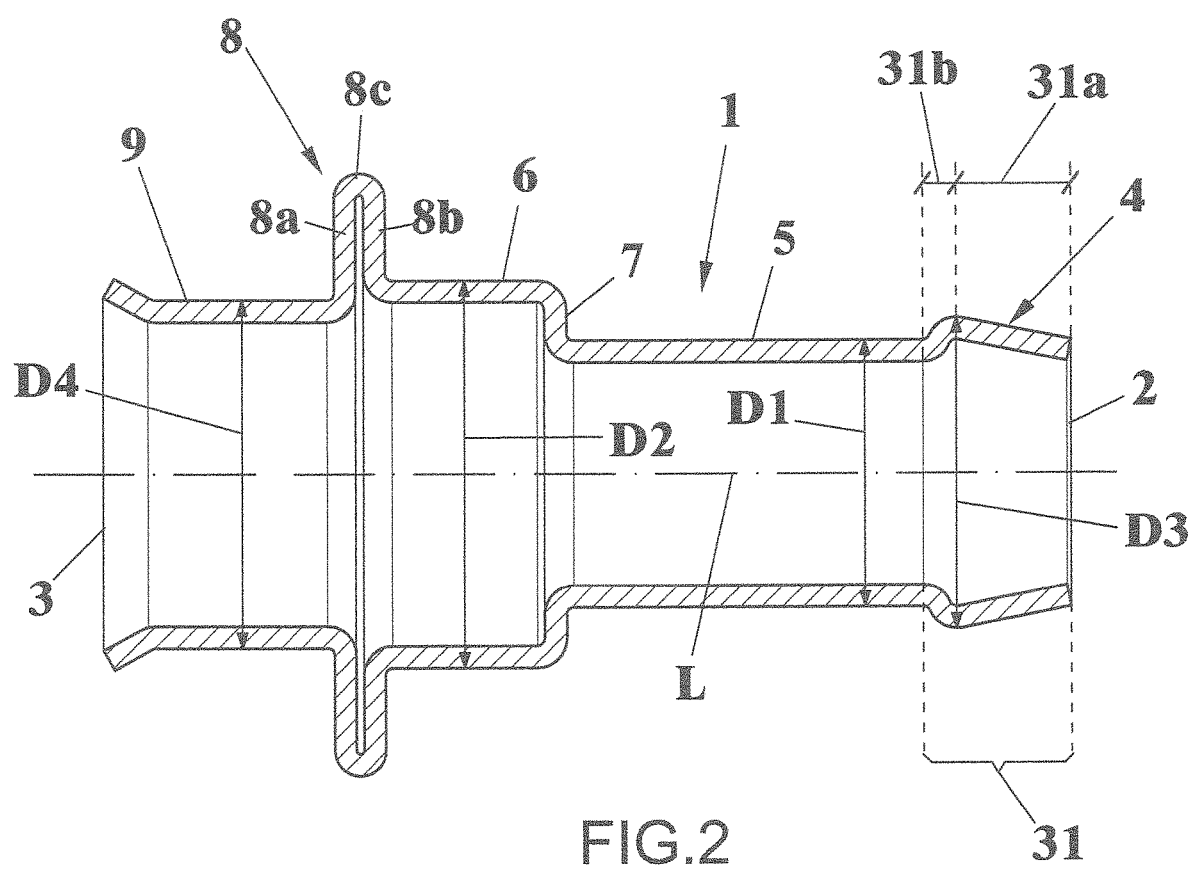
FIG. 2 shows an axial section vie of a second type of hose connection obtainable with the method provided by the invention.
Figure 3B:
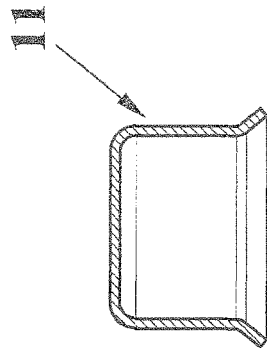
FIGS. 3a-3i show the sequence of processing steps to obtain the first type of hose connection.
Figure 3C:
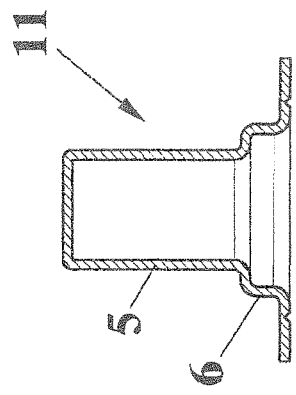
Figure 3F:
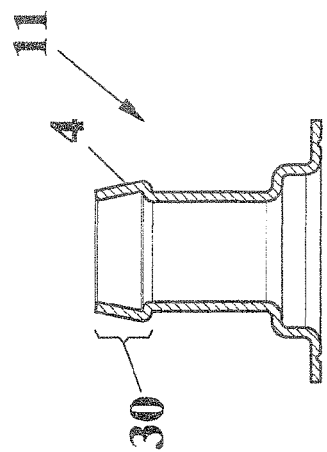
Figure 3A:
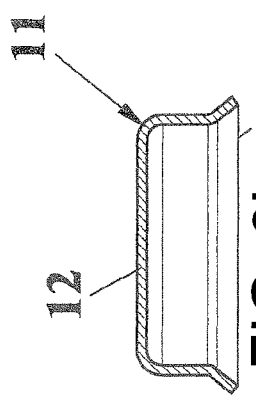
Figure 3E:
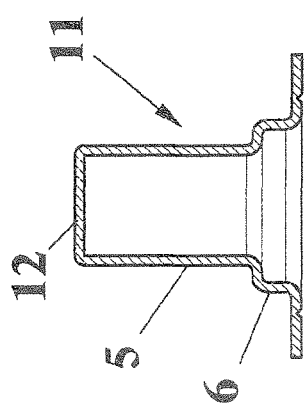
Figure 3I:
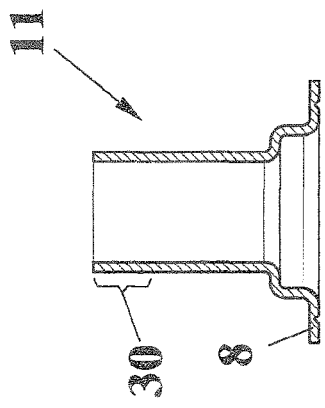
Figure 3D:
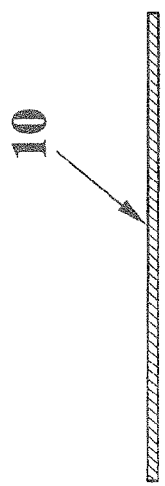
Figure 3G:
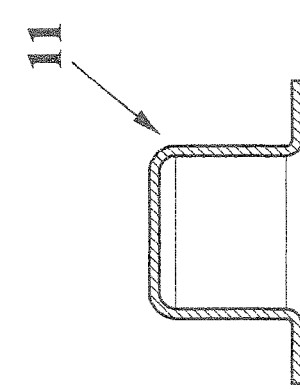
Figure 3H:
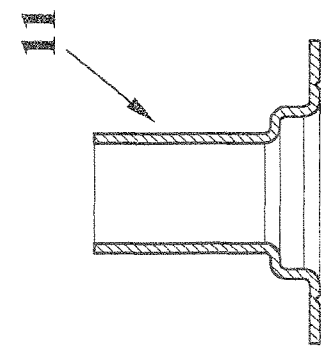

In the version of the body 1 shown in FIG. 2, on the other hand, the flange 8 connects the second cylindrical portion 6 of the metal sheet body 1 to a third cylindrical portion 9 of the metal sheet body 1. In this case, the flange 8 is realised by two annular portions 8a, 8b of metal sheet overlapping and connected by a 180° fold 8c. The outer diameter D4 of the third cylindrical portion 9 has an intermediate dimension, between diameter D1 and diameter D2. The third cylindrical portion 9 ends at the top end 3 of the hollow body 1, which is flared with respect to the third cylindrical portion 9 of the metal sheet body 1. With this version of the metal sheet body 1. the seal may be pre-assembled with the metal sheet body 1. Flaring of the top end 3 of the hollow body 1 has, in fact, the function of retaining against withdrawal for the seal, which is fitted onto the third cylindrical portion 9.

The method of realisation of the hose connection will be fully described with reference to the version of the connection shown in FIG. 1.

A flat metal sheet disc 10 of a specific thickness is used (step 3a in FIG. 3).

The metal sheet disc 10 is initially subjected to a sequence of drawing operations. In particular, a first drawing (step 3b in FIG. 3) forms from the metal sheet disc 10 a semi-processed axially hollow cylindrical piece 11 having a closed base end 12 and a top end 13 flared towards the outside.

A subsequent drawing (step 3c in FIG. 3) performs a necking of the diameter and an axial lengthening of the semi-processed piece 11.

A subsequent drawing (step 3d in FIG. 3) performs a further necking of the diameter and flattens the flaring 14 of the top end 13 of the semi-processed piece 11 to obtain the flange 8.

The subsequent operation comprises reduction, by means of an appropriate mould, of the diameter of the semi-processed piece 11 selectively in an axial section of the semi-processed piece 11, which extends as far as the base end (step 3e in FIG. 3).

The first cylindrical portion 5 and the second cylindrical portion 6 of the connection are obtained from this operation.

The subsequent operation comprises adjustment, by means of an appropriate mould, of the diameter and the axial length of the first cylindrical portion 5 and the second cylindrical portion 6 (step 3f in FIG. 3).

The subsequent operation comprises mechanical boring of the base end 12 of the semi-processed piece 11 for complete opening of its axial cavity (step 3g in FIG. 3).

The subsequent operation comprises trimming of the flange to give it the final dimension and shape (step 3h of FIG. 3).

The last operation is forming by means of a mould of a terminal section 30 of the semi-processed piece 11 comprising the base end 12 for the creation of the hooking tooth (step 3i of FIG. 3).

The mould subjects the terminal section 30 of the semi-processed piece 11 to an axial compression of a magnitude such as to generate a plastic deformation of radial expansion until it is shaped to surfaces 15a, 16a of the mould.

The mould is provided with a moulding matrix 15 having a tapered moulding surface 15a, oriented coaxially to the axis H of the mould and a moulding counter-matrix 16 having a flat annular moulding surface 16a coaxial to the axis H of the mould.

The moulding surface 15a communicates with a cavity 15b of the matrix 15, which extends coaxially to the axis H of the mould.

The moulding matrix 15 is coaxiaily translatable to axis H of the mould.

The moulding counter-matrix 16 is formed of several modular sectors 16' to form the moulding surface 16a, and in particular the counter-matrix 16 is formed of two sectors 16' adapted to cooperate to form the moulding surface 16a.

The sectors 16' also have semi-cylindrical walls 16" oriented coaxiaily to the axis H of the mould and diametrically opposed, which may be coupled to the first cylindrical portion 5 of the semi-processed piece 11.

The sectors 16' are radially translatable with respect to axis H of the mould.

Each sector 16' is supported by a carriage 18 mobile in a guide 20 in a radial direction to the axis H of the mould in contrast to and by action of appropriate elastic means, for example a helical spring 19.

The guides 20 are supported by a fixed frame 21 which, in turn, supports a centring punch 22 arranged coaxiaily to the axis H of the mould.

The centring punch 22 crosses the space region delimited between sectors 16' and extends longitudinally as far as to face the matrix 15, and is housed in the axial cavity of a guide bush 23 on which an extractor 24 is slidable coaxiaily to the axis H of the mould.

The extractor 24 extends longitudinally along axis H of the mould and has an open axial cavity also at the end turned towards the matrix 15 to travel reversibly from a position advanced beyond the end of the centring punch 22 turned towards the matrix 15 in a backward position with respect to the end of the centring punch 15 turned towards the matrix 15.

The guide bush 23 has a shorter length to the centring punch 22 so as to leave uncovered its end turned towards the matrix 15.

The surface 25 of the end of the extractor 24 turned towards the matrix 15 has a flat annular shape and is oriented orthogonally to the axis H of the mould to act as a resting surface of the semi-processed piece 11.

Moulding of the tooth 4 takes place in the following manner.

Figure 4:
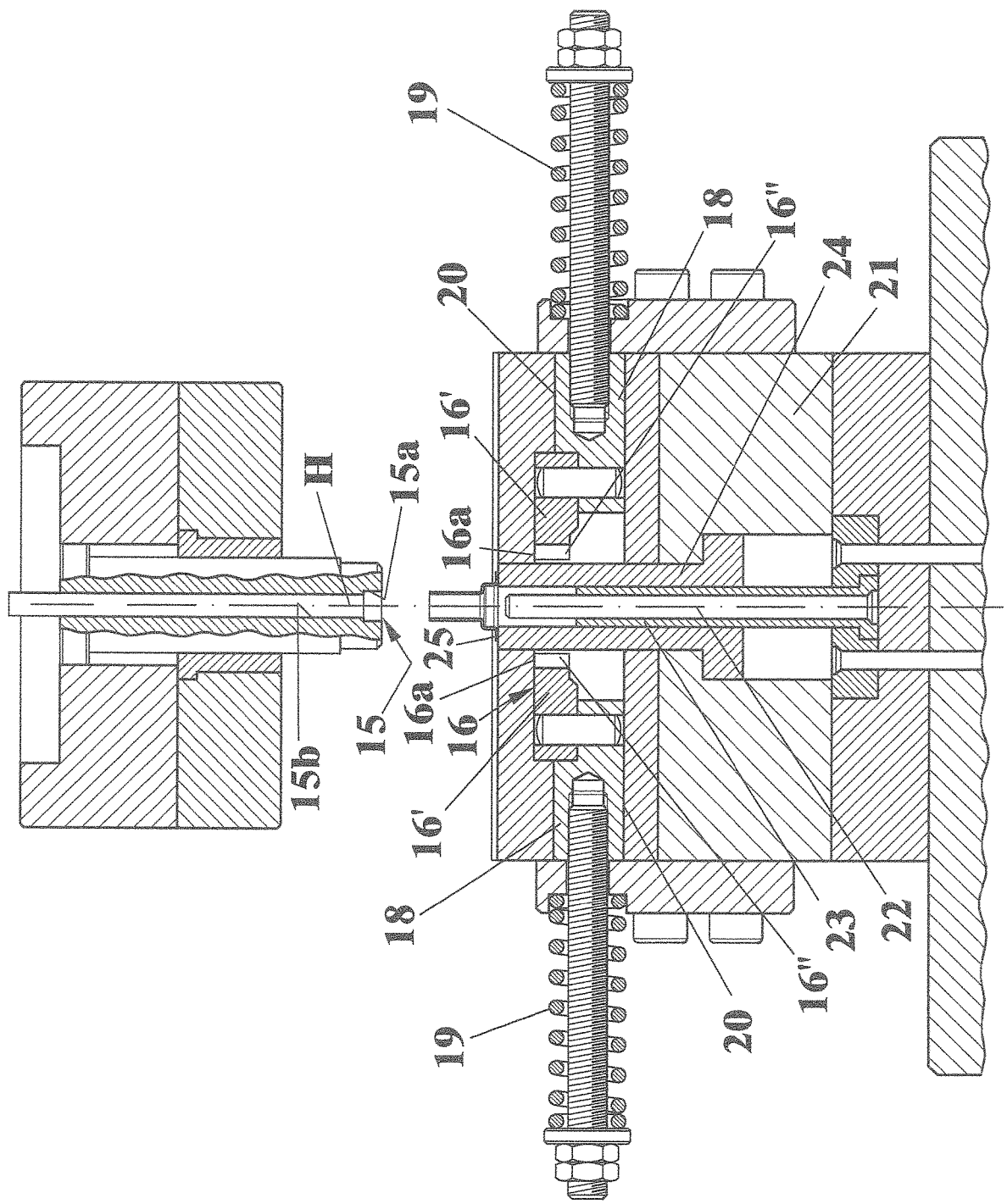
FIG. 4 shows the open-mould system of forming the tooth.
Figure 5:
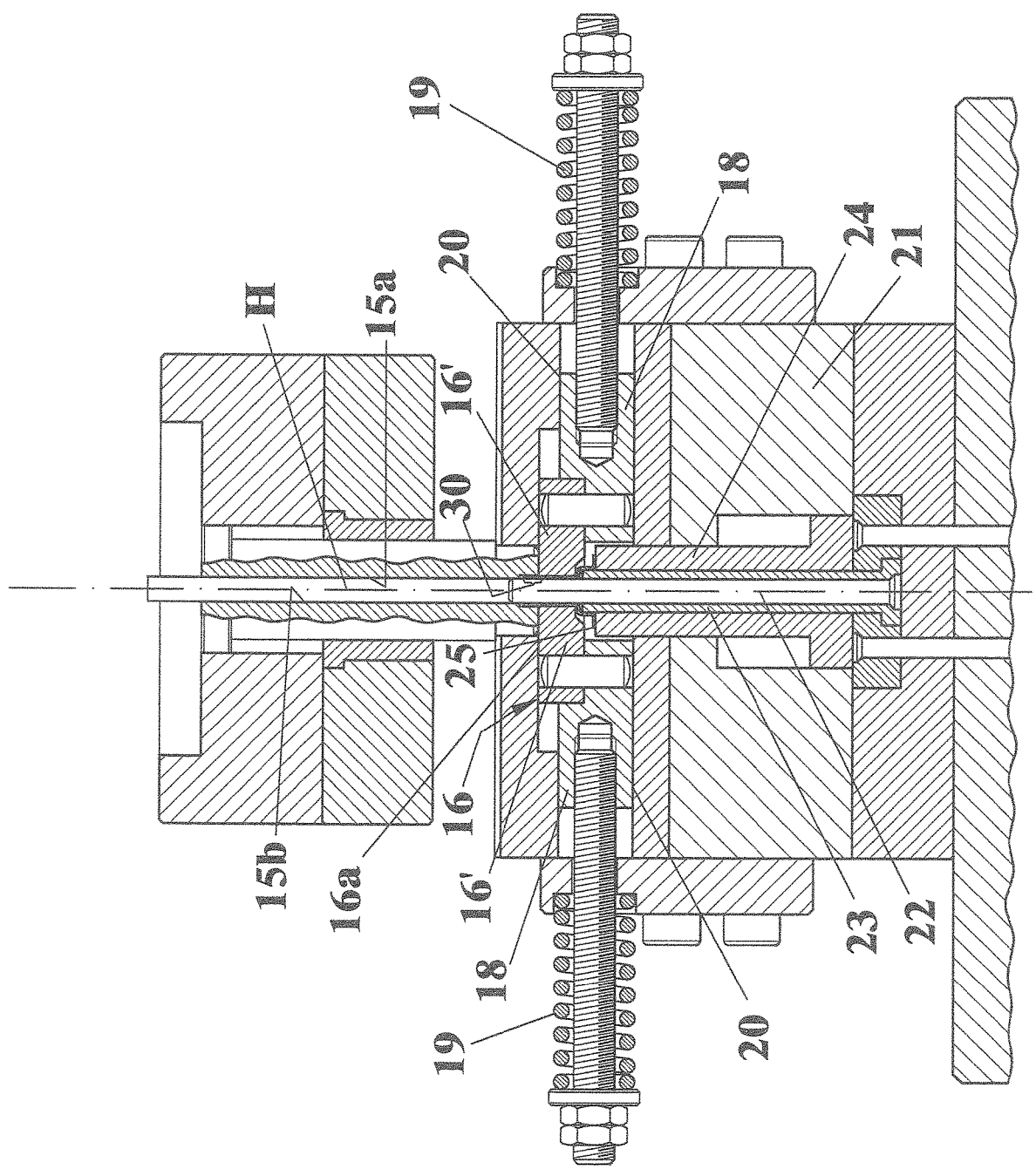
FIG. 5 shows the closed-mould system of forming the tooth.

Initially, the mould is open (FIG. 4), the extractor 24 is in an advanced position with respect to the centring punch 22 turned towards the matrix 15, and the carriages 18 position the sectors 16' at a distance from the extractor 24.

The semi-processed piece 11 is positioned with the flange 8 resting coaxially to the annular surface 25.

The matrix 15 performs a first travel towards the counter-matrix 16.

During said travelling movement the matrix 15 intercepts the base end 12 of the semi-processed piece 11 and drags the semi-processed piece 11 and solidally the extractor 24 as far as a position in which the semi-processed piece 11 is interposed between the sectors 16' and the extractor 24 reaches an end of stroke.

The movement of the extractor 24 causes passage of the centring punch 22 across the axial cavity of the semi-processed piece 11, up to engaging in the cavity 15b of the matrix 15.

At the end of the first travelling movement of the matrix 15, the carriages 18 are moved until the sectors 16' couple with their semi-cylindrical surfaces to the first cylindrical portion 5 of the semi-processed piece 11.

The sectors 16' tighten at a distance from, the base end 12 of the semi-processed piece 11 equal to the axial length of the terminal section 30 of the semi-processed piece 11 which must be moulded.

A second travelling movement of the matrix 15 in the same direction as the first travelling movement follows to close the mould.

During this second travelling movement, the mould exerts an axial compression on the semi-processed piece 11.

The terminal section 30 of the semi-processed piece 11 comprised between the moulding surface 16a of the counter-matrix 16 and the base end 12, as an effect of the axial compression to which it is subjected by the mould, deforms plastically, expanding in a radial direction until it is shaped to surfaces 15a and 16a of the mould.

Realisation of the hose connection in the version illustrated in FIG. 2, with reference in particular to forming of the tooth of hooking to the hose, is completely the same as the one illustrated and therefore will not be repeated.

After opening of the mould, the extractor 24 is activated to withdraw the finished piece from the centring punch 22.

The materials used, as well as the dimensions, may in practice be of any type according to requirements and the state of the art.

The invention claimed is:

1. A method of making a hose connection for a hose, comprising at least the following steps of processing of a metal sheet:
   drawing the metal sheet to form a semi-processed axially hollow cylindrical piece having a closed base end and a top end;
   opening the entire base end of the semi-processed piece;
   forming an external flange on the semi-processed piece;
   forming at least one external tooth for hooking to the hose;
   selectively reducing a diameter of a first cylindrical portion of the semi-processed piece comprising the base end with respect to a second cylindrical portion of the semi-processed piece adjacent to the first cylindrical portion to form between said first and second cylindrical portions a connection wall extending on a plane orthogonal to an axis of said piece; and
   forming said flange radially outwardly from said second cylindrical portion at an end of said second cylindrical portion opposite to said first cylindrical portion to form the second cylindrical portion into a right cylindrical portion, said flange being formed as a flat flange orthogonal to said axis and comprising two opposite surfaces external to an open axial cavity and orthogonal to said axis, one of the two opposite surfaces being proximal and the other one being distal to said connection wall,
   wherein the step of forming the at least one external tooth is performed, after the opening of the entire base end, with a mould which is closed onto a terminal section of the semi-processed piece comprising the base end so as to subject it to an axial compression inducing a plastic deformation of radial expansion towards an outer surface of the cylindrical piece through which the terminal section shapes to surfaces of the mould, the at least one external tooth including a first tapered wall with a diameter gradually decreasing towards the opening of wherein the diameter of the first tapered wall is smallest at the base end, and a second tapered wall connecting between the first tapered wall and the first cylindrical portion.

2. The method of making the hose connection for the hose according to claim 1, wherein the mould has a tapered surface and an annular surface oriented coaxially to the tapered surface.

3. The method of making the hose connection for the hose according to claim 2, wherein the surfaces of the mould may be activated in a relative travelling movement along an axis of the mould.

4. The method of making the hose connection for the hose according to claim 1, wherein before closure of the mould a centering punch is inserted through the axial cavity of the semi-processed piece.

5. The method of making the hose connection for the hose according to claim 1, wherein the metal sheet is steel.

6. The method of making the hose connection for the hose according to claim 1, wherein the metal sheet is brass.

7. The method of making the hose connection for the hose according to claim 1, wherein the metal sheet has a thickness not less than 0.6 mm.

8. The method of making the hose connection for the hose according to claim 1, wherein the flange is formed at the second cylindrical portion.

9. The method of making the hose connection for the hose according to claim 1, wherein the flange is formed at the top end of the semi-processed piece.

10. The method of making the hose connection for the hose according to claim 1, wherein the flange is formed by two annular portions of the metal sheet overlapping and connected by a 180° fold.

11. A hose connection for a hose, the hose connection being produced by the method according to claim 1.

* * * * *